(12) United States Patent
Kobayashi et al.

(10) Patent No.: US 9,080,659 B2
(45) Date of Patent: Jul. 14, 2015

(54) IN-WHEEL MOTOR DRIVING DEVICE

(75) Inventors: Tsune Kobayashi, Nukata-gun (JP);
Motoyasu Yamamori, Nagoya (JP);
Tohru Onozaki, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 13/979,311

(22) PCT Filed: Jan. 11, 2012

(86) PCT No.: PCT/JP2012/050384
§ 371 (c)(1),
(2), (4) Date: Jul. 11, 2013

(87) PCT Pub. No.: WO2012/096309
PCT Pub. Date: Jul. 19, 2012

(65) Prior Publication Data
US 2013/0283950 A1    Oct. 31, 2013

(30) Foreign Application Priority Data

Jan. 11, 2011 (JP) ................... 2011-003349
Feb. 17, 2011 (JP) ................... 2011-032206
Mar. 30, 2011 (JP) ................... 2011-073852
Nov. 24, 2011 (JP) ................... 2011-256577
Dec. 21, 2011 (JP) ................... 2011-280033

(51) Int. Cl.
*B60K 7/00* (2006.01)
*F16H 48/20* (2012.01)
(Continued)

(52) U.S. Cl.
CPC *F16H 48/20* (2013.01); *B60K 1/02* (2013.01); *B60K 6/365* (2013.01); *B60K 6/52* (2013.01);
(Continued)

(58) Field of Classification Search
USPC ........ 180/65.1, 65.51, 65.6, 65.7; 310/80, 83; 475/5
See application file for complete search history.

(56) References Cited

U.S. PATENT DOCUMENTS 6,727,631 B2 * 4/2004 Nishimura ............... 310/266
6,943,473 B2 * 9/2005 Furuse et al. ............. 310/112
(Continued)

FOREIGN PATENT DOCUMENTS

CN    201038912 Y    3/2008
CN    101719711 A    6/2010
(Continued)

OTHER PUBLICATIONS

International Search Report Issued Apr. 10, 2012 in PCT/JP12/050384 Filed Jan. 11, 2012.
(Continued)

*Primary Examiner* — John Walters
*Assistant Examiner* — Brian Swenson
(74) *Attorney, Agent, or Firm* — Oblon, McClelland, Maier & Neustadt, L.L.P.

(57) ABSTRACT

In an in-wheel motor driving device, since an involute speed reduction gear with a small difference in number of teeth which can be made small in size can be disposed on an inner side of an inner rotor type motor, a size of the in-wheel motor driving device in the direction of a rotational axis can be reduced. Further, in the inner rotor type motor, since a first stator is disposed so as to face a radially outer side of a large-diameter rotor, heat generated in the first stator is easily dissipated. On the other hand, in an outer rotor type motor, since a second stator is disposed so as to face a radially inner side of a small-diameter rotor, a torque radius of the small-diameter rotor can be made large, thereby making it possible to ensure a large torque capacity. Because of this, the outer rotor type motor can be made smaller in diameter than the inner rotor type motor, thereby making it possible to ensure a large space within a wheel.

8 Claims, 4 Drawing Sheets

(51) Int. Cl.
*B60K 6/365* (2007.10)
*B60K 6/52* (2007.10)
*B60L 3/00* (2006.01)
*B60L 11/12* (2006.01)
*B60L 11/14* (2006.01)
*B60L 15/20* (2006.01)
*B60W 10/08* (2006.01)
*B60W 20/00* (2006.01)
*B60W 30/184* (2012.01)
*H02K 7/116* (2006.01)
*F16H 48/34* (2012.01)
*B60K 1/02* (2006.01)
*B60K 17/356* (2006.01)
*F16H 48/08* (2006.01)
*F16H 1/32* (2006.01)

(52) U.S. Cl.
CPC ............ *B60K 7/0007* (2013.01); *B60K 17/356* (2013.01); *B60L 3/0061* (2013.01); *B60L 11/123* (2013.01); *B60L 11/14* (2013.01); *B60L 15/20* (2013.01); *B60W 10/08* (2013.01); *B60W 20/00* (2013.01); *B60W 30/1843* (2013.01); *F16H 48/34* (2013.01); *H02K 7/116* (2013.01); *B60L 2240/36* (2013.01); *B60L 2240/423* (2013.01); *B60L 2240/425* (2013.01); *B60L 2260/28* (2013.01); *B60W 2510/087* (2013.01); *B60W 2710/083* (2013.01); *B60W 2720/406* (2013.01); *F16H 48/08* (2013.01); *F16H 2001/325* (2013.01); *Y02T 10/6217* (2013.01); *Y02T 10/6265* (2013.01); *Y02T 10/641* (2013.01); *Y02T 10/648* (2013.01); *Y02T 10/7077* (2013.01); *Y02T 10/7275* (2013.01); *Y10T 74/19642* (2015.01)

(56) References Cited

U.S. PATENT DOCUMENTS

| | | | |
|---|---|---|---|
| 7,063,637 B2* | 6/2006 | Yamauchi et al. | 475/5 |
| 7,350,605 B2* | 4/2008 | Mizutani et al. | 180/65.51 |
| 7,520,366 B2* | 4/2009 | Kuroumaru et al. | 180/444 |
| 8,267,208 B2* | 9/2012 | Kleuker | 180/65.22 |
| 2003/0015931 A1 | 1/2003 | Nishimura | |
| 2004/0080223 A1 | 4/2004 | Shimizu | |
| 2008/0142284 A1* | 6/2008 | Qu et al. | 180/65.6 |
| 2011/0285238 A1* | 11/2011 | Kusase et al. | 310/156.48 |

FOREIGN PATENT DOCUMENTS

| | | |
|---|---|---|
| JP | 3-215101 A | 9/1991 |
| JP | 06 284788 | 10/1994 |
| JP | 06 327294 | 11/1994 |
| JP | 9-98519 A | 4/1997 |
| JP | 2002 247713 | 8/2002 |
| JP | 2003 32978 | 1/2003 |
| JP | 2003-309957 A | 10/2003 |
| JP | 2005-81872 A | 3/2005 |
| JP | 2007-232083 A | 9/2007 |
| JP | 2008 168790 | 7/2008 |
| JP | 2009-250402 A | 10/2009 |
| WO | 2007 141841 | 12/2007 |

OTHER PUBLICATIONS

Japanese Office Action issued Jan. 6, 2015 in Patent Application No. 2011-073852 (with English Translation).

Office Action issued on Apr. 1, 2015, in Chinese Patent Application No. 201280005152.X (with English-language Translation).

* cited by examiner

IN-WHEEL MOTOR DRIVING DEVICE

TECHNICAL FIELD

The present invention relates to an in-wheel motor driving device incorporated in a wheel of a vehicle and rotates the wheel.

BACKGROUND ART

For example, Patent Literature 1 discloses an in-wheel motor driving device including a motor, a cycloid speed reduction gear interposed between the motor and a wheel bearing, a control device for controlling the driving of the motor and a temperature sensor mounted on the motor. When a vehicle equipped with an in-wheel motor driving device runs at low speeds, a large torque is needed, and when the motor and the speed reduction gear are overloaded, the temperature of the motor or the like tends to rise excessively. Then, the control device limits the driving electric current of the motor according to information on a temperature measured by the temperature sensor so as to prevent an excessive increase in the temperature of the motor or the like.

In addition, Patent Literature 2 discloses an inverter device for driving a motor which has two rotors, having different outputs and disposed on the same output shaft, and two stators. In this inverter device, individual inverter circuits are provided exclusively for the rotors. Then, the inverter circuit for one of the two rotors which has a smaller output is controlled with a high frequency, while the inverter circuit of the other rotor which has a larger output is controlled with a low frequency, whereby the heat value of the motor is suppressed.

Additionally, Patent Literature 3 discloses a motor control device for controlling the driving of two motors. In this motor control device, a load distribution ratio at which the total loss of the two motors becomes the least is determined based on the required outputs and detected temperatures of the motors to control the driving of the motors, whereby the increase in the temperatures of the two motors is suppressed.

PRIOR ART LITERATURE

Patent Literature

Patent Literature 1: JP-A-2008-168790
Patent Literature 2: JP-A-6-327294
Patent Literature 3: JP-A-6-284788

SUMMARY OF THE INVENTION

Problem that the Invention is to Solve

A pivot which is provided at a distal end of a lower arm which supports a steering knuckle and other components are disposed within a wheel of a vehicle. Because of this, a space where to dispose an in-wheel motor driving device is limited, and hence, the in-wheel motor driving device needs to be made small in size. In addition, when a vehicle equipped with an in-wheel motor driving device runs at low speeds, the in-wheel motor driving device needs to exhibit a large torque, and the heat generation from the in-wheel motor driving device needs to be suppressed.

All the inventions described in Patent Literatures 1 to 3 can suppress the heat generation from the motors. However, when it is made small in size, the cycloid speed reduction gear cannot bear a large torque. Because of this, with the in-wheel motor driving device including the cycloid speed reduction gear which is described in Patent Literature 1, there is a limitation on types of vehicles to which it can be applied. Additionally, the in-wheel motor driving device described in Patent Literature 2 in which the speed reduction gear is fitted on the motor is enlarged in the direction of the rotational axis. In addition, the in-wheel motor driving device described in Patent Literature 3 in which the speed reduction gear is fitted on each of the two separate motors is enlarged further. Because of this, it is difficult to accommodate the enlarged motor within the wheel where the space where to accommodate the motor is limited.

The invention has been made in view of these situations, and an object thereof is to provide a small in-wheel motor driving device that has a large torque capacity and which can suppress the generation of heat.

Means for Solving the Problem

According to the invention, there is provided an in-wheel motor driving device comprising a motor unit which is incorporated within a wheel of a vehicle and which includes a motor and a speed reduction gear, and a control device which is configured to control driving of the motor, wherein a cylindrical rotor, a cylindrical first stator which is disposed so as to face a radially outer side of the rotor, and a cylindrical second stator which is disposed so as to face a radially inner side of the rotor and which is disposed so as to be deviated in the direction of a rotational axis relative to the first stator are included, and the speed reduction gear is disposed on the radially inner side of the rotor and on a radially inner side of the first stator.

A mechanism connecting a steering wheel with the wheel of the vehicle should be disposed on the radially outer side of the rotor and a radially outer side of the second stator within the wheel of the vehicle.

The speed reduction gear should include an involute gear from an outer circumferential side of which a rotational force of the motor is inputted and from an inner circumferential side of which the rotational force of the motor is outputted.

The control device should control the driving of the motor by switching alternately an electric power supply to the first stator and an electric power supply to the second stator.

Advantage of the Invention

According to the invention, the motor unit includes the first stator and the second stator. Namely, the motor unit substantially has two motors. However, the rotor is shared by the two motors. Consequently, outputs of the two motors are outputted from the single common rotor. Additionally, having the two motors as the common rotor enables the outputs and serving hours of the two motors to be used separately, thereby making it possible to suppress the heat generation from the first stator and the second stator.

Further, according to the invention, since the first stator is disposed so as to face the radially outer side of the rotor, heat generated in the first stator is easily dissipated. In addition, a space is defined on the radially inner side of the rotor by disposing the first stator on the radially outer side of the rotor. The speed reduction gear is disposed in the space which is defined on the radially inner side of the first stator and on the radially inner side of the rotor. Namely, the first stator and the speed reduction gear are disposed in the same axial position. By adopting this arrangement, the in-wheel motor driving device can be made small in the axial direction while improving the heat dissipating properties of the first stator. Here, the axial length of the wheel cannot be ensured so long. Namely, by adopting the configuration described above, the motor unit can be accommodated within the wheel in an ensured fashion.

Here, with a view to ensuring a large torque capacity, it is desired that the rotor has a large diameter. Because of this, the diameter of a portion of the rotor which faces the second stator in the radial direction should be as large as possible. Additionally, as has been described above, the speed reduction gear has already been disposed on the radially inner side of the rotor and on the radially inner side of the first stator. Because of this, the speed reduction gear does not have to be disposed on a radially inner side of the portion of the rotor which faces the second stator in the radial direction. Namely, the more the diameter of the rotor is increased to ensure a large torque capacity, the more space can be defined on the radially inner side of the rotor. Then, the second stator can be disposed in the space. Consequently, the torque capacity by the second stator can be made large, and the radial size of the in-wheel motor driving device can be made small.

A mechanism which connects the steering wheel with the wheel needs to be disposed within the steered wheel. Namely, a space where to enable the mechanism to be disposed within the wheel needs to be ensured. In the in-wheel motor, since the motor unit is disposed within the wheel, it is not easy for the mechanism to be disposed so.

Here, according to the invention, the outside diameter of the inner rotor type motor having the first stator becomes the outside diameter of the first stator. On the other hand, the outside diameter of the outer rotor type motor having the second stator becomes the outside diameter of the portion of the rotor. Namely, even though the diameter of the rotor with which the required torque capacity is ensured is ensured, the outer rotor type motor having the second stator can define the space on the radially outer side of the motor within the wheel. Then, by disposing the mechanism which connects the steering wheel with the wheel in the space, the motor unit and the connecting mechanism can be disposed within the wheel while the motor unit is allowed to include the two motors, and both the two motors can ensure their required torque capacities.

According to the invention, since the involute speed reduction gear, which can be made small in size, can be disposed on the inner side of the rotor of the inner rotor type motor, the size in the direction of the rotational axis can be reduced.

According to the invention, while one of the inner rotor type motor and the outer rotor type motor is being used, the other can be kept stopped for rest, and therefore, the heat generation from the motors can be suppressed.

MODE FOR CARRYING OUT THE INVENTION (Schematic Inner Configuration of Wheel Fitted with In-wheel Motor Driving Device)

Figure 1:
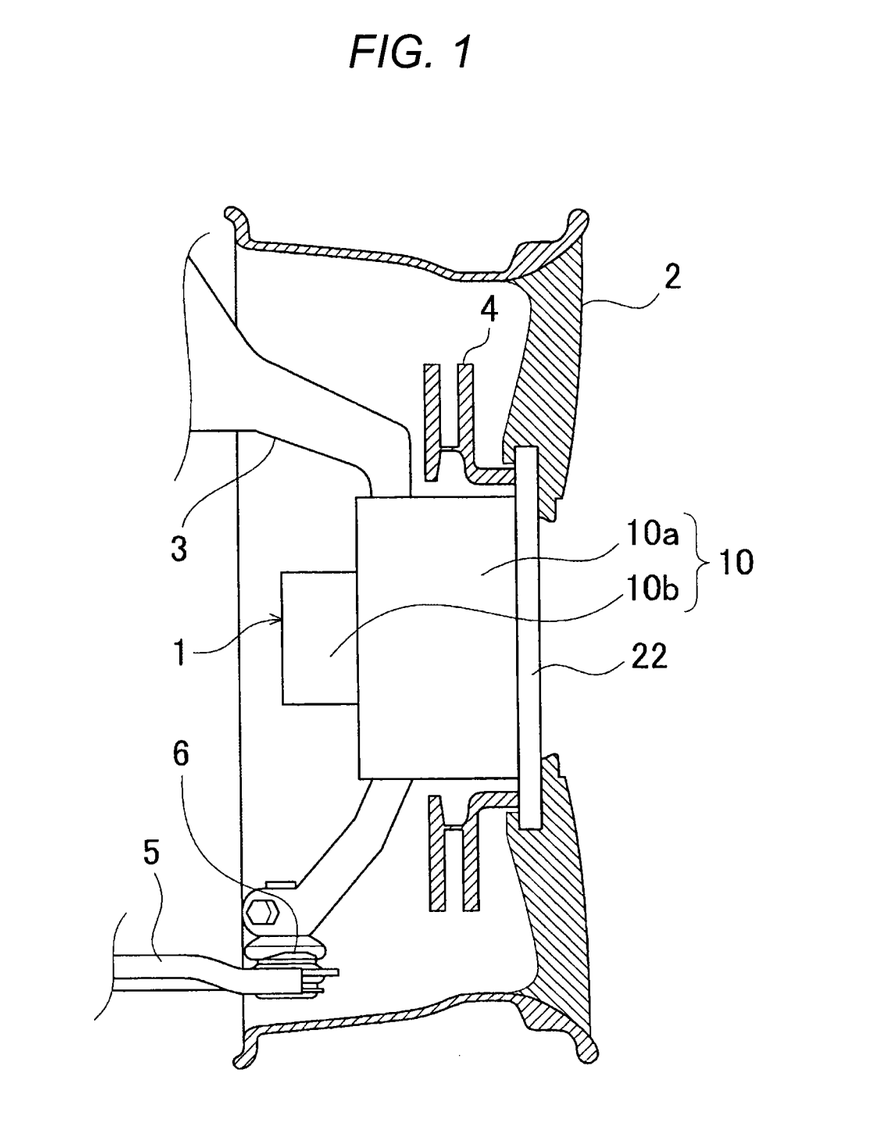
FIG. 1 is a partial sectional view showing a schematic inner configuration of a wheel fitted with an in-wheel motor driving device of this embodiment.

A schematic inner configuration of a wheel 2 fitted with an in-wheel motor driving device 1 of this embodiment will be described by reference to FIG. 1. The in-wheel motor driving device 1 is provided at the center of the wheel 2. A steering knuckle 3 is fixed to a housing 10 of the in-wheel motor driving device 1. The wheel 2 and a brake disc 4 are fixed to an output member 22 of the in-wheel motor driving device 1. The steering knuckle 3 is supported on a lower arm 5 via a pivot 6 which is provided at a distal end of the lower arm 5. It should be noted that the steering knuckle 3, the lower arm 5 and the pivot 6 constitute a mechanism for connecting a steering wheel, not shown, with the wheel 2.

(Configuration of In-wheel Motor Driving Device)

Figure 2:
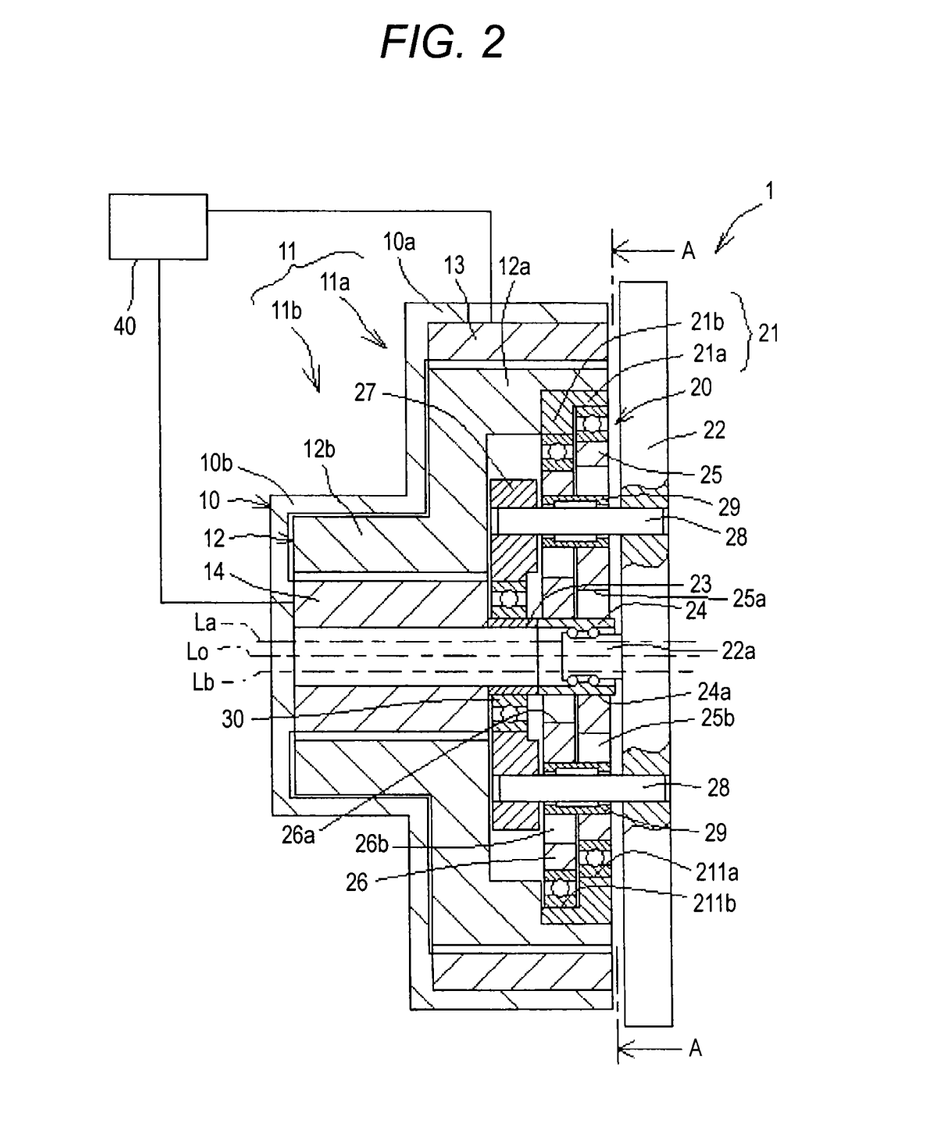
FIG. 2 is a sectional view showing the in-wheel motor driving device shown in FIG. 1.
Figure 3:
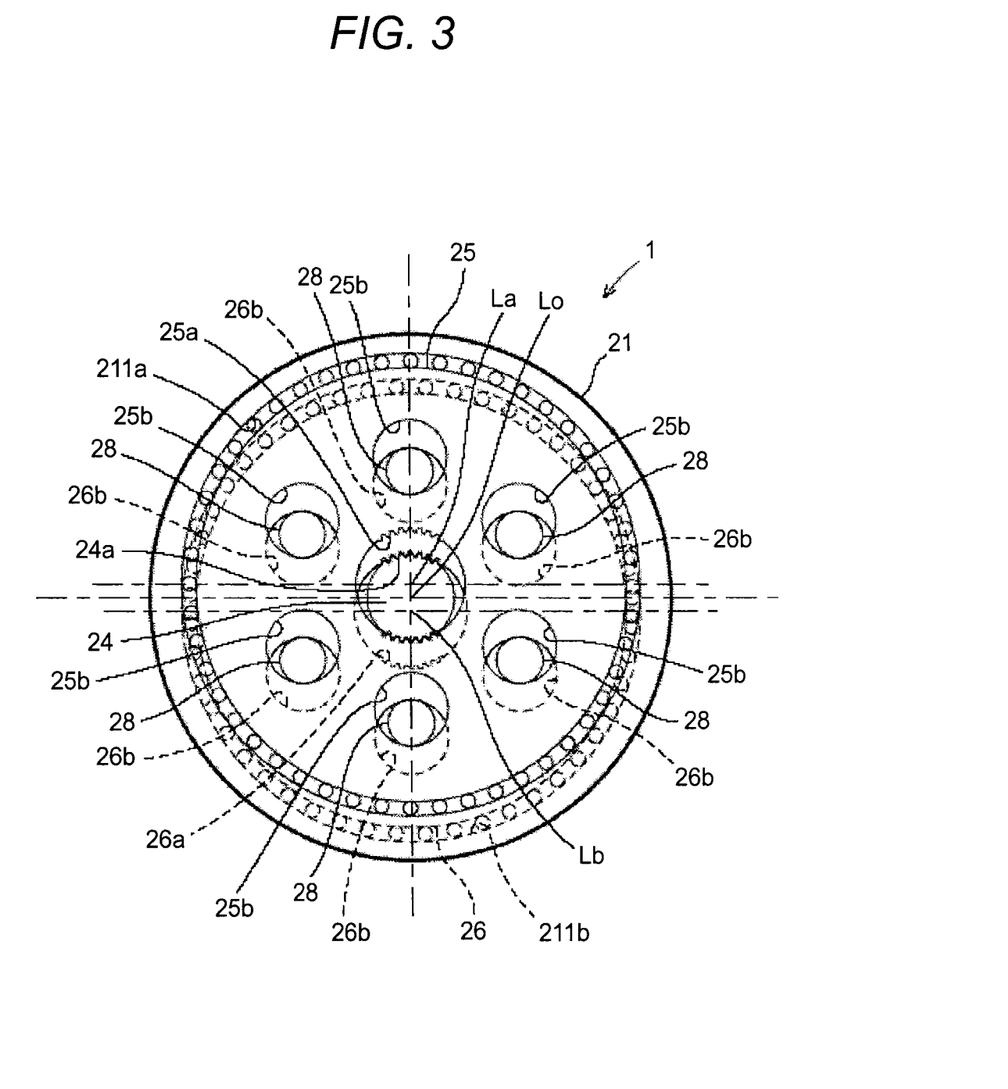
FIG. 3 is a view of a main part of the in-wheel motor driving device resulting when seen in the direction of the line A-A in FIG. 2.

The configuration of the in-wheel motor driving device 1 will be described by reference to FIGS. 2 and 3. The in-wheel motor driving device 1 includes the housing 10, a motor 11, an involute speed reduction gear 20 and a control device 40. The motor 11 is made up of an inner rotor type motor 11a and an outer rotor type motor 11b which are disposed end to end in the direction of a rotational axis. The involute speed reduction gear 20 is an involute speed reduction gear with a small difference in number of teeth and is disposed on an inner side of the inner rotor type motor 11a. The motor unit including the motor 11 and the involute speed reduction gear 20 are incorporated in the wheel 2 of the vehicle. Although it will be described in detail later, the rotational driving force of either or both of the inner rotor type motor 11a and the outer rotor type motor 11b is transmitted to the involute speed reduction gear 20 for reduction in speed.

(Configuration of Motor)

The housing 10 includes a large-diameter cylindrical housing 10a accommodating the inner rotor type motor 11a and a small-diameter cylindrical housing 10b accommodating the outer rotor type motor 11b which are formed integrally.

The motor 11 includes a rotor 12 in which a large-diameter rotor 12a and a small-diameter rotor 12b are formed integrally so as to be aligned coaxially end to end with each other in the direction of a rotational axis thereof, that is, a rotor 12 which is formed into a stepped cylindrical shape, a first stator 13 having a cylindrical shape which is disposed so as to face a radially outer side of the large-diameter rotor 12a, and a second stator 14 having a cylindrical shape which is disposed so as to face a radially inner side of the small-diameter rotor 12b. Namely, the inner rotor type motor 11a is made up of the large-diameter rotor 12a and the first stator 13, and the outer rotor type motor 11b is made up of the small-diameter rotor 12b and the second stator 14.

The large-diameter rotor 12a and the small-diameter rotor 12b, which are both cylindrical, each include, for example, a rotor yoke and a magnet. In addition, the first stator 13 and the second stator 14 each include a stator core and a coil wound around the stator core. The first stator 13 is fixed to an inner circumferential surface of the large-diameter housing 10a. The second stator 14 is fixed to a bottom surface of the small-diameter housing 10b.

According to this configuration, since the involute speed reduction gear 20 with a small difference in number of teeth which can be made small in size can be disposed on an inner side of the inner rotor type motor 11a, the size in the direction of the rotational axis can be reduced. Further, in the inner rotor type motor 11a, since the first stator 13 is disposed so as to face the radially outer side of the large-diameter rotor 12a, heat generated in the first stator 13 is easily dissipated. On the other hand, in the outer rotor type motor 11b, since the second stator 14 is disposed so as to face the radially inner side of the small-diameter rotor 12b, a torque radius of the small-diameter rotor 12b can be made large, thereby making it possible to ensure a large torque capacity. Because of this, the outer rotor type motor 11b can be made smaller in diameter than the inner rotor type motor 11a, thereby making it possible to ensure a large space within the wheel 2. Consequently, the pivot 5 provided at the distal end of the lower arm 4 which supports the steering knuckle 3 and other components whose illustration is omitted can be disposed within the wheel 2.

(Operation of Motor)

Figure 4:
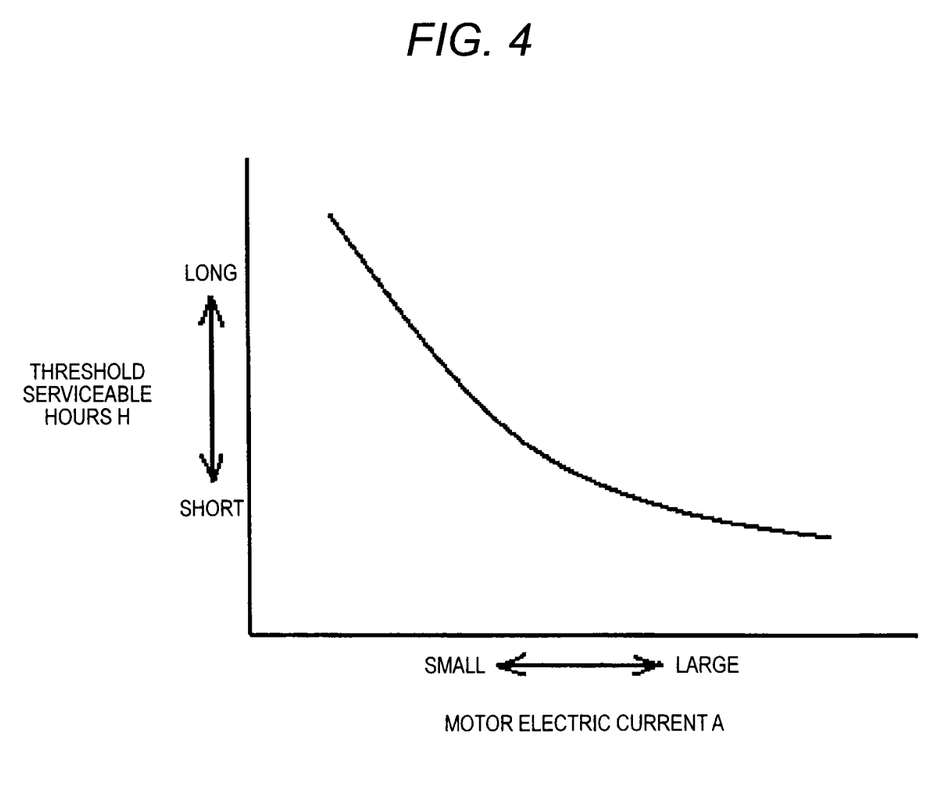
FIG. 4 is a diagram showing a relation between an electric current A supplied to a motor (the torque of the motor) and threshold serviceable hours H which constitute a service limit where the temperature of the motor reaches a predetermined temperature.

The control device 40 controls an electric current which is supplied to the first stator 13 and the second stator 14 so as to control the rotation of the motor 11. Here, as shown in FIG. 4, when an electric current A which is supplied to the motor 11 (the torque of the motor 11) is increased, threshold serviceable hours H which constitute a service limit where the temperature of the motor 11 reaches a predetermined temperature (for example, 200°) are reduced in an exponential function-like fashion. Then, the control device 40 repeats, for example, the following control. Namely, firstly, the electric current A is supplied only to the first stator 13, and the supply of the electric current to the first stator 13 is stopped before the threshold serviceable hours H, which correspond to the electric current A, are reached. Next, the electric current A is supplied only to the second stator 14, and the supply of the electric current to the second stator 14 is stopped before the threshold serviceable hours H, which correspond to the electric current A, are reached. In this way, by switching alternately the electric currents (electric power) supplied to the first stator 13 and the second stator 14, since when one of the inner rotor type motor 11a and the outer rotor type motor 11b is being used, the other can be stopped for rest, the heat generation from the motor 11 can be suppressed. In addition, the control device 40 can supply the electric current (electric power) to the first stator 13 and the second stator 14 simultaneously, allowing a large torque to be exhibited.

(Configuration of Involute Speed Reduction Gear)

The involute speed reduction gear 20 includes mainly an input member 21, an output member 22, a fixed shaft member 23, a gear shaft 24, a first oscillating member 25, a second oscillating member 26, and a pin supporting member 27. The housing 10 supports the input member 21 and the output member 22 directly or indirectly so as to rotate about a common input/output axis Lo.

The input member 21 is a member which rotates around the input/output axis Lo as the motor 11 is driven. The input member 21 has a cylindrical shape and is integrated with a distal inner circumferential portion of the large-diameter rotor 12a. A first eccentric portion 21a and a second eccentric portion 21b are formed on an inner circumferential surface of the input member 21. The first eccentric portion 21a is an annular portion which has a cylindrical inner surface 211a which is centered on a first eccentric axis La which is an eccentric axis which deviates from the input/output axis Lo. The second eccentric portion 21b is an annular portion which has a cylindrical inner surface 211b which is centered on a second eccentric axis Lb that is an eccentric axis which deviates from the input/output axis Lo and which differs from the first eccentric axis La.

In addition, the first eccentric portion 21a and the second eccentric portion 21b are formed so as to deviate in opposite directions to each other with respect to the input/output axis Lo. By doing so, the cylindrical inner surface 211a of the first eccentric portion 21a and the cylindrical inner surface 211b of the second eccentric portion 21b are formed at angular intervals of 180 (degrees) so as to lie at equal intervals in a rotational direction about the input/output axis Lo.

The output member 22 is a member which rotates around the input/output axis Lo as the motor 11 is driven. The output member 22 has a disc shape. A rotational shaft 22a is supported rotatably on an inner circumference of the gear shaft 24, and an outer circumference of the rotational shaft is connected to the wheel 2 (refer to FIG. 1). The output member 22 will be described in detail later. The fixed shaft member 23 is a fixed member which does not rotate relative to the housing 10 even when the speed reduction gear 20 is driven. The fixed shaft member 23 has a cylindrical shape and is integrated with a distal end of the second stator 14. The gear shaft 24 is a sun gear on a cylindrical outer circumference of which external teeth 24a which are involute teeth are formed and is integrated with a distal end of the fixed shaft member 23.

The first oscillating member 25 has an annular shape and has an internal gear 25a having involute teeth and insertion holes 25b, being a planetary gear which is supported rotatably on the cylindrical inner surface 211a of the first eccentric portion 21a on an outer circumferential surface thereof. The internal gear 25a is formed on an inner circumferential surface of the first oscillating member 25 and is a gear which can mesh with the external teeth 24a of the gear shaft 24. By adopting this configuration, the first oscillating member 25 oscillates and rotates relative to the input/output axis Lo in association with rotation of the input member 21 with the internal gear 25a caused to mesh with the external teeth 24a of the gear shaft 24.

The insertion holes 25b are pin holes that are formed so as to penetrate both end faces of the first oscillating member 25 in the direction of the input/output axis Lo and into which pins 28 which are supported by a pin supporting member 27, which will be described later, are inserted. In this embodiment, as shown in FIG. 3, the insertion holes 25b are formed in six locations and are disposed at equal intervals in a circumferential direction of the first oscillating member 25. A bore diameter of the insertion holes 25b of the first oscillating member 25 is set so as to be substantially equal to a sum of a diameter of the pin 28 inserted thereinto and a deviating amount of the first oscillating member 25 (a distance at which the input/output axis Lo is spaced apart from the first eccentric axis La). In this embodiment, however, since a rolling bearing 29 is fitted on the pin 28, the diameter of the pin 28 corresponds to a diameter of the rolling bearing 29.

The second oscillating member 26 has an annular shape and has an internal gear 26a having involute teeth and insertion holes 26b, being a planetary gear which is supported rotatably on the cylindrical inner surface 211b of the second eccentric portion 21b on an outer circumferential surface thereof. The internal gear 26a is formed on an inner circumferential surface of the second oscillating member 26 and is a gear which can mesh with the external teeth 24a of the gear shaft 24. By adopting this configuration, the second oscillating member 26 oscillates and rotates relative to the input/output axis Lo in association with rotation of the input member 21 with the internal gear 26a caused to mesh with the external teeth 24a of the gear shaft 24.

The insertion holes 26b are pin holes that are formed so as to penetrate both end faces of the second oscillating member 26 in the direction of the input/output axis Lo, into which the pins 28 which are supported by the pin supporting member 27 are inserted and which fits the pins 28 via the rolling bearing 29. In this embodiment, as shown in FIG. 3, the insertion holes 26b are formed in six locations and are disposed at equal intervals in a circumferential direction of the second oscillating member 26. An inside diameter of the insertion holes 26b of the second oscillating member 26 is set so as to be substantially equal to a sum of the diameter of the pin 28 inserted thereinto and a deviating amount of the second oscillating member 26 (a distance at which the input/output axis Lo is spaced apart from the second eccentric axis Lb). In this embodiment, however, since the rolling bearing 29 is fitted on the pin 28, the diameter of the pin 28 corresponds to the diameter of the rolling bearing 29.

The first oscillating member 25 and the second oscillating member 26 which are made up of the planetary gears of the same type in this way are supported by the first eccentric portion 21a and the second eccentric portion 21b, respectively. Additionally, the cylindrical inner surface 211a of the first eccentric portion 21a and the cylindrical inner surface 211b of the second eccentric portion 21b are formed at angular intervals of 180 (degrees) so as to be disposed at equal intervals in the rotational direction about the input/output axis Lo. Adopting this configuration results in a relation in which the first oscillating member 25 and the second oscillating member 26 are positioned at equal intervals in the circumferential direction of the rotation about the input/output axis Lo. Here, as the input member 21 rotates, the first and second eccentric portions 21a, 21b rotate, and the first and second oscillating members 25, 26 oscillate and rotate as the first and second eccentric portions 21a, 21b rotate so. Respective rotational or spinning axes (the first eccentric axis La and the second eccentric axis Lb) of the first and second oscillating members 25, 26 revolve around the input/output axis Lo while maintaining their symmetric positions relative to the input/output axis Lo due to the positional relation described above.

The pin supporting member 27 is a disc-shaped member which is supported by the fixed shaft member 23 via a bearing 30 and is disposed so as to rotate about the input/output axis Lo. This pin supporting member 27 is situated in a direction in which the pins 28 project relative to the first and second oscillating members 25, 26. Additionally, in the pin supporting member 27, an equal number of pin holes to the number of pins 28 are formed so as to be connected with end portions of the pins 28 which pass through the insertion holes 25b, 26b of the first and second oscillating members 25, 26 through press or loose fitting. By doing so, the pin supporting member 27 supports the six pins 28 which are fixed to the output member 22 and rotates at the same rotational speed as that of the output member 22 as the output member 22 rotates.

The output member 22 is situated in the direction in which the pins 28 project relative to the first and second oscillating members 25, 26. In addition, in the output member 22, an equal number of pin holes to the number of pins 28 are formed so as to be connected with the end portions of the pins 28 which pass through the insertion holes 25b, 26b of the first and second oscillating members 25, 26 through press or loose fitting. As the first and second oscillating members 25, 26 oscillate and rotate in association with rotation of the input member 21, the driving force is transmitted from inner circumferential surfaces of the respective insertion holes 25b, 26b of the first and second oscillating members 25, 26 via the pins 28 and the rolling bearings 29 to the output member 22. As this occurs, due to the dimensional relation of the outside diameter of the rolling bearing 29 with the individual insertion holes 25b, 26b, only the rotational component of the oscillation and rotation of the first and second oscillating members 25, 26 is transmitted. Namely, the output member 22 is connected to the first and second oscillating members 25, 26 so as to be linked with the rotational component of the oscillation and rotation of the first and second oscillating members 25, 26.

(Operation of Involute Speed Reduction Gear)

Next, the operation of the involute speed reduction gear 20 will be described. Firstly, when the motor 11 is actuated, the first eccentric portion 21a and the second eccentric portion 21b of the input member 21 which is integrated with the large-diameter rotor 12a of the motor 11 rotate. Then, the first oscillating member 25 which is supported on an inner circumferential side of the first eccentric portion 21a oscillates and rotates as the first eccentric portion 21a rotates. Similarly, the second oscillating member 26 which is supported on an inner circumferential side of the second eccentric portion 21b oscillates and rotates as the second eccentric portion 21b rotates. As they do so, the first and second oscillating members 25, 26 revolve about the input/output axis Lo at a revolving speed equal to the rotational speed of the input member 21 as the input member 21 rotates.

Here, the internal gears 25a, 26a of the first and second oscillating members 25, 26 individually mesh with the external teeth 24a of the gear shaft 24 only at part of the circumferences thereof. Additionally, the gear shaft 24 is fixed to the fixed shaft member 23. Therefore, the first and second oscillating members 25, 26 rotate on the first and second eccentric axes La, Lb, respectively, at a rotational speed based on a difference in the number of teeth between the internal gears 25a, 26a and the external teeth 24a of the gear shaft 24 while revolving. The rotational directions then become an opposite direction to the rotational direction of the input member 21 (in case the input member 21 rotates in a clockwise direction, the internal gears 25a, 26a rotate in a counterclockwise direction).

Here, the pins 28 are inserted in the respective insertion holes 25b, 26b of the first and second oscillating members 25, 26. Then, outer circumferential surfaces of the rolling bearings 29 which are fitted on the pins 28 are brought into abutment with the corresponding inner circumferential surfaces of the insertion holes 25b, 26b only at part of circumferences of the rolling bearings 29 whereby the driving force is transmitted thereto. By doing so, when the first and second oscillating members 25, 26 oscillate and rotate, the rotational component is transmitted to the pins 28. Then, the output member 22 rotates at the rotational speed at which the first and second oscillating members 25, 26 rotate on their own axes. In this way, the output member 22 takes out the rotational component from the oscillation and rotation of the first and second oscillating members 25, 26 via the pins 28 and the rolling bearings 29, and the rotation inputted from the input member 21 is decelerated to be outputted from the output member 22.

(Working Effect of In-Wheel Motor Driving Device)

The motor unit of the in-wheel motor driving device 1 includes the first stator 13 and the second stator 14 and substantially has the two motors 11a, 11b. However, the rotor 12 (the large-diameter rotor 12a, the small-diameter rotor 12b) is shared commonly by the two motors 11a, 11b, and therefore, the respective outputs of the two motors 11a, 11b are outputted from the same rotor 12. Then, by using the outputs of the two motors 11a, 11b and the servicing hours separately, heat generated from the first stator 13 and the second stator 14 can be suppressed.

Further, since the first stator 13 is disposed so as to face the radially outer side of the large-diameter rotor 12a, heat generated in the first stator 13 is easily dissipated. Additionally, by disposing the first stator 13 on the radially outer side of the rotor 12, the space is defined on the radially inner side of the large-diameter rotor 12a. The involute speed reduction gear 20 is disposed in the space defined on the radially inner side of the first stator 13 and on the radially inner side of the large-diameter rotor 12a. Namely, the first stator 13 and the involute speed reduction gear 20 are disposed in the same position in the axial direction. By disposing the first stator 13 and the involute speed reduction gear 20 in the way described above, a reduction in size of the in-wheel motor driving device 1 can be realized while improving the heat dissipating properties of the first stator 13. Here, the axial length of the wheel 2 cannot be made so long. Namely, by adopting the configuration that has been described heretofore, the motor unit can be accommodated within the wheel 2 in an ensured fashion.

In addition, with a view to ensuring a large torque capacity, it is desired that the small-diameter rotor 12b has a large diameter. Because of this, the diameter of the portion of the small-diameter rotor 12b which faces the second stator 14 in the radial direction should be as large as possible. As described above, the involute speed reduction gear 20 is disposed on the radially inner side of the large-diameter rotor 12a and on the radially inner side of the first stator. Because of this, the involute speed reduction gear 20 does not have to be disposed on the radially inner side of the portion of the small-diameter rotor 12b which faces the second stator 14 in the radial direction. Namely, the more the diameter of the small-diameter rotor 12b is increased to ensure a large torque capacity, the more space can be defined on the radially inner side of the rotor 12. Then, the second stator 14 is disposed in the space. Consequently, the torque capacity by the second stator 14 can be made large, and the radial size of the in-wheel motor driving device 1 can be made small.

In addition, the outside diameter of the inner rotor type motor having the first stator 13 becomes the outside diameter of the first stator 13. On the other hand, the outside diameter of the outer rotor type motor having the second stator 14 becomes the outside diameter of the portion of the small-diameter rotor 12b. Namely, even though the diameter of the small-diameter rotor 12b with which the required torque capacity is ensured, the outer rotor type motor having the second stator 14 can define the space on the radially outer side of the motor within the wheel 2. Then, by disposing the mechanism which connects the steering wheel with the wheel 2 in the space, the motor unit and the connecting mechanism can be disposed within the wheel 2 while the motor unit is allowed to include the two motors 11a, 11b, and both the two motors 11a, 11b can ensure their required torque capacities.

Modified Example

While the diameter of the inner rotor type motor 11a is made large and the diameter of the outer rotor type motor 11b is made small, the diameters of the inner rotor type motor 11a and the outer rotor type motor 11b may be made the same. In addition, the invention can also be applied to speed reduction gears which are configured differently from the involute speed reduction gear 20.

INDUSTRIAL APPLICABILITY

According to the invention, it is possible to provide the small in-wheel motor driving device that has the large torque capacity and which can suppress the generation of heat.

DESCRIPTION OF REFERENCE NUMERALS

1: in-wheel motor driving device
2: wheel
3: steering knuckle
5: lower arm
6: pivot
10, 10a, 10b: housing
11: motor 11
11a: inner rotor type motor
11b: outer rotor type motor
12: rotor
12a: large-diameter rotor
12b: small-diameter rotor
13: first stator
14: second stator
20: involute speed reduction gear
21: input member
22: output member
23: fixed shaft member
24: gear shaft
25: first oscillating member
26: second oscillating member
27: pin supporting member
40: control device

The invention claimed is:

1. An in-wheel motor driving device comprising:
   a motor unit which is incorporated within a wheel of a vehicle and which includes a motor and a speed reduction gear; and
   a control device which is configured to control driving of the motor, wherein
   the motor includes:
   a cylindrical rotor;
   a cylindrical first stator which is disposed so as to face a radially outer side of the rotor; and
   a cylindrical second stator which is disposed so as to face a radially inner side of the rotor and which is disposed so as to be deviated in a direction of a rotational axis relative to the first stator, and
   the speed reduction gear is disposed on the radially inner side of the rotor and on a radially inner side of the first stator, wherein
   an output side end portion of the second stator is located at an inner side of an output side end portion of the first stator along the direction of the rotational axis,
   an output side end portion of the rotor and the output side end portion of the first stator are located at the substantially same position along the direction of the rotational axis,
   the second stator is located at a radially inner side of the first stator, and
   the speed reduction gear is located at the radially inner side of the rotor, and at the output side end portion of the rotor along the direction of the rotational axis, and is adjacent to the second stator.

2. The in-wheel motor driving device according to claim 1, wherein
   a mechanism connecting a steering wheel with the wheel of the vehicle is disposed on the radially outer side of the rotor and a radially outer side of the second stator within the wheel of the vehicle.

3. The in-wheel motor driving device according to claim 2, wherein
   the speed reduction gear includes an involute gear from an outer circumferential side of which a rotational force of the motor is inputted and from an inner circumferential side of which the rotational force of the motor is outputted.

4. The in-wheel motor driving device according to claim 3, wherein
   the control device controls the driving of the motor by switching alternately an electric power supply to the first stator and an electric power supply to the second stator.

5. The in-wheel motor driving device according to claim 2, wherein
   the control device controls the driving of the motor by switching alternately an electric power supply to the first stator and an electric power supply to the second stator.

6. The in-wheel motor driving device according to claim 1, wherein
the speed reduction gear includes:
an oscillating member having an annular shape, and including an internal gear having involute teeth, and an insertion hole between an inner circumference and an outer circumference;
an input member having a cylindrical shape, and including an annular portion having a cylindrical inner surface which deviates a central axis of the cylindrical shape:
a pin having a cylindrical shape, and passing through the insertion hole;
an output member having a disc shape, and connected with an end portion of the pin; and
a gear shaft having a cylindrical shape, including external teeth at an outer circumference which mesh with the internal gear of the oscillating member, and fixed to a fixed shaft,
the oscillating member is rotatably supported by the annular portion of the input member, and
a rotational force of the motor is transmitted from the input member to the oscillating member, the pin and the output member.

7. The in-wheel motor driving device according to claim 6, wherein
the control device controls the driving of the motor by switching alternately an electric power supply to the first stator and an electric power supply to the second stator.

8. The in-wheel motor driving device according to claim 1, wherein
the control device controls the driving of the motor by switching alternately an electric power supply to the first stator and an electric power supply to the second stator.

* * * * *